United States Patent [19]

Umehara

[11] Patent Number: 4,971,583

[45] Date of Patent: Nov. 20, 1990

[54] APPARATUS FOR OUTBOARD ENGINE FOR SWITCHING TO VOICE ALARM OUTPUT

[75] Inventor: Kazuhiro Umehara, Hamamatsu, Japan

[73] Assignee: Suzuki Jidosha Kogyo Kabushiki Kaisha, Shizuoka, Japan

[21] Appl. No.: 357,418

[22] Filed: May 25, 1989

[30] Foreign Application Priority Data

May 31, 1988 [JP] Japan ................................ 63-133408
Sep. 28, 1988 [JP] Japan ................................ 63-243665

[51] Int. Cl.$^5$ ................................................ G08B 21/00
[52] U.S. Cl. ........................................ 440/2; 340/449; 340/460
[58] Field of Search ................ 440/2, 1; 340/460, 449

[56] References Cited

U.S. PATENT DOCUMENTS

| | | | |
|---|---|---|---|
| 4,314,232 | 2/1982 | Tsunoda | 340/460 |
| 4,352,088 | 9/1982 | Tsundo | 340/460 |
| 4,352,089 | 9/1982 | Yano et al. | 340/460 |
| 4,359,713 | 11/1982 | Tsundo | 340/460 |
| 4,359,714 | 11/1982 | Tsunoda et al. | 340/460 |
| 4,389,639 | 6/1983 | Torii et al. | 340/460 |
| 4,426,691 | 1/1984 | Kawasaki | 340/460 |
| 4,438,422 | 3/1984 | Nojiri et al. | 340/460 |
| 4,503,528 | 3/1985 | Nojiri et al. | 340/460 |
| 4,671,111 | 6/1987 | Lemelson | 340/439 |
| 4,695,822 | 9/1987 | Furukawa | 340/449 |

FOREIGN PATENT DOCUMENTS 57-55240 4/1982 Japan.

Primary Examiner—Sherman Basinger
Assistant Examiner—Thomas J. Brahan
Attorney, Agent, or Firm—Flynn, Thiel, Boutell & Tanis

[57] ABSTRACT

An apparatus for use in an outboard engine provides a voice alarm output when an abnormality of cooling water or the like is detected during operation of a radio or the like, the abnormal state being announced with a synthesized voice. The apparatus has a plurality of sensors for detecting the abnormality of the cooling water and the like, and a voice output circuit to receive detection signals from the sensors and to output a synthesized voice signal identifying the abnormal state. An acoustic reproducing apparatus such as a radio is provided, and a common speaker is used to output the radio output or the voice output signal of the voice output circuit. A voice discriminating switching circuit is provided between the voice output circuit and the acoustic reproducing apparatus. The voice discriminating circuit detects the level of an output signal of the voice output circuit and temporarily switches the speaker from the acoustic reproducing apparatus to the voice output circuit in response to the level.

11 Claims, 5 Drawing Sheets

APPARATUS FOR OUTBOARD ENGINE FOR SWITCHING TO VOICE ALARM OUTPUT

FIELD OF THE INVENTION

The present invention relates to an apparatus for use in an outboard engine for switching to a voice alarm output and, more particularly, to a voice alarm output switching apparatus for use in an outboard engine which, in a case where an abnormality of cooling water or the like is detected during the operation of a radio or the like, the abnormal state is identified by a synthesized voice output.

BACKGROUND OF THE INVENTION

Hitherto, many voice alarm output switching apparatuses for use in automobiles have been studied and developed, and a relatively large number of such apparatuses have been put into practical use. However, such an apparatus for use in an outboard engine does not exist.

As a voice alarm output switching apparatus for use in an automobile, for instance, there is known the invention disclosed in Japanese Publication No. 57-55240. According to that invention, a system is provided in which the operation of the transceiver, stereophonic phonograph, radio, or the like provided in the interior of the automobile is automatically controlled by the voice of a drive (instead of by manual operation) and, at the same time, the command announced by the driver is confirmed by a synthesized voice. If an abnormality of a section of the vehicle occurs, it is announced by the synthesized voice. When such an abnormal state occurs, outputting of the alarm voice takes precedence over the arithmetic operations of a computer which controls the automatic operation of each apparatus in the vehicle.

However, according to the foregoing invention disclosed in Japanese Publication No. 57-55240, the switching between the voice alarm output and, for instance, the radio output is controlled by a microcomputer (that is, it is controlled by the software of the microcomputer). Therefore, a controller needs to be provided between the microcomputer and the radio and the like. The whole construction becomes complicated and expensive. Further, since the switching is executed by the software, there is an inconvenience in that the response speed is slow.

It is an object of the present invention to reduce the inconveniences of such a conventional arrangement and to provide a voice alarm output switching apparatus for use in an outboard engine, in which the construction is simple, the apparatus can be cheaply manufactured, and the response speed is high when switching from an output of a radio or the like to a voice alarm output.

SUMMARY OF THE INVENTION

The objects of the present invention are met by providing a plurality of sensors for detecting abnormality of cooling water and the like, and a voice output circuit for receiving output signals from the plurality of sensors and identifying the abnormal state by outputting a voice signal. The voice output circuit is provided with an acoustic reproducing arrangement such as a radio or the like, and uses a common speaker for the acoustic reproducing arrangement and for the voice output of the voice output circuit. A voice discriminating switching arrangement detects a level of an output signal from the voice output circuit, and temporarily switches the speaker from the acoustic reproducing arrangement to the voice output circuit in response to the level.

According to another aspect of the invention, the voice discriminating switching arrangement temporarily switches the speaker from the acoustic reproducing arrangement to the voice output circuit in accord with an operation signal output from the voice output circuit during the generation of the voice output signal from the voice output circuit.

BRIEF DESCRIPTION OF THE DRAWINGS

The above and other objects and features of the present invention will become apparent from the following detailed description and the appended claims, with reference to the accompanying drawings, in which:

DETAILED DESCRIPTION

A first embodiment of the present invention will be described hereinbelow with reference to FIGS. 1 to 4.

Figure 1:
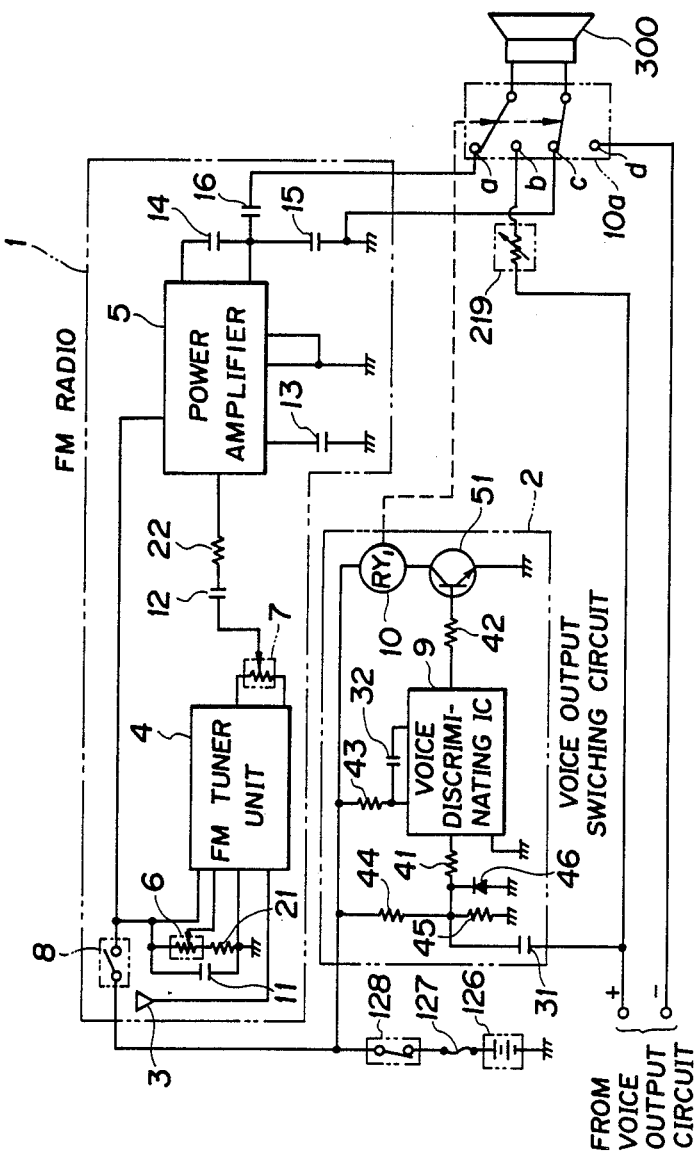
FIG. 1 is a diagrammatic view of part of a first embodiment of the present invention.
Figure 2:
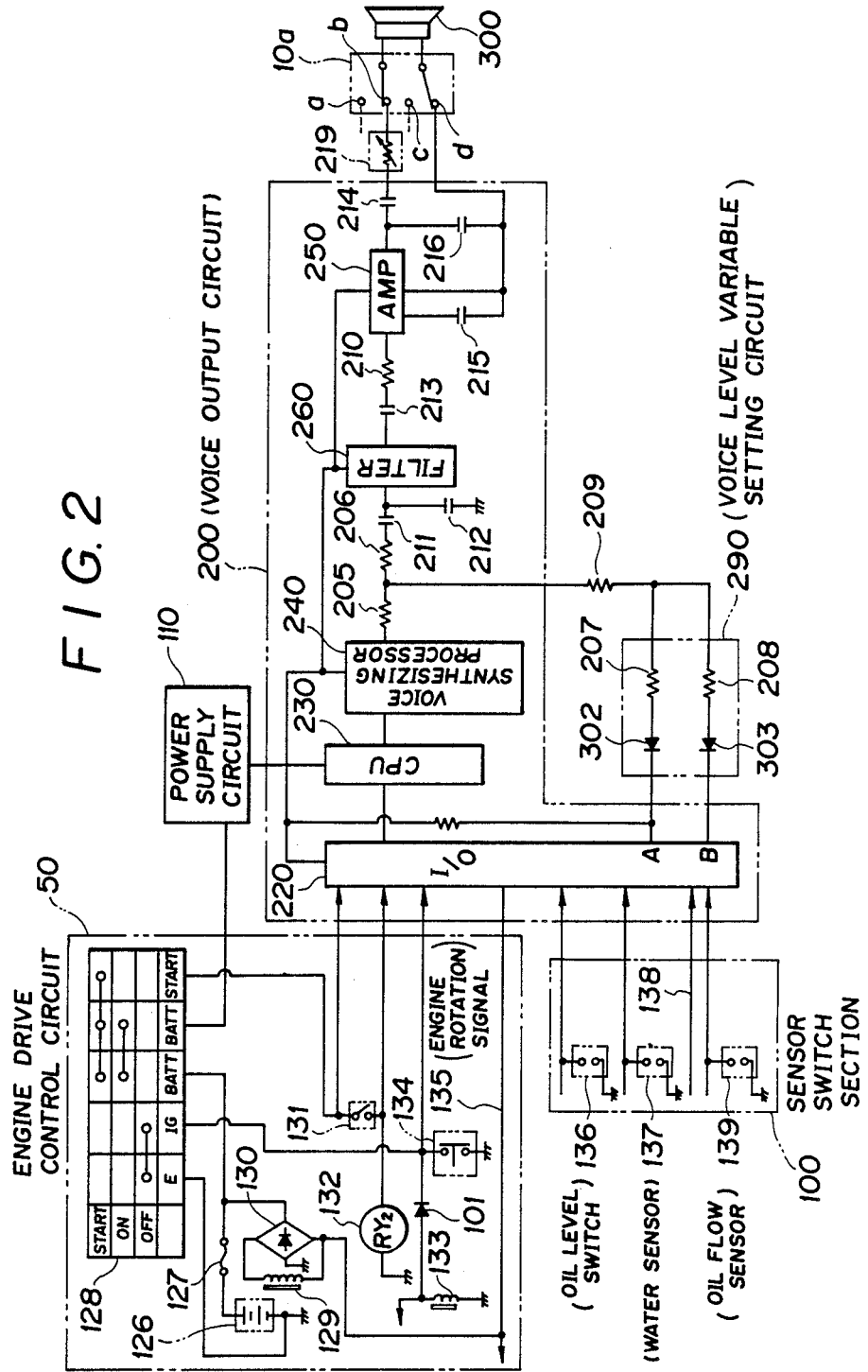
FIG. 2 is a diagrammatic view of a further part of the embodiment of FIG. 1.

The embodiment comprises: an engine drive control circuit 50 shown in FIG. 2; a sensor switch section 100 having a plurality of sensors to detect an abnormality of cooling water and the like; a voice output circuit 200 for discriminating the presence or absence of an abnormality, the necessity of an alarm and the like on the basis of signals from the sensors of the sensor switch section 100, for also deciding the priorities of input signals in accordance with a predetermined program, and for synthesizing and outputting a voice; a speaker 300 for converting an output from the voice output circuit 200 into a voice; an FM radio 1 (FIG. 1) which is arranged beside the voice output circuit 200 and also commonly uses the speaker 300 as an acoustic reproducing device; and a voice output switching circuit 2 arranged between the voice output circuit 200 and the FM radio 1. On the other hand, the voice output circuit 200 has a voice level variable setting circuit 290 for automatically changing an output level of the voice output circuit 200 in a step by step manner in response to an increase in the rotating speed of the engine.

A contact portion $10_a$ of a relay $RY_1$ shown at 10 in FIG. 1, which will be explained hereinafter, is arranged between the voice output circuit 200 and the speaker 300. In the following description regarding the voice output circuit 200, it is assumed for convenience of explanation that the two contacts of contact portion $10_a$ are positioned so as to connect the speaker 300 to the voice output circuit 200, or in other words are respectively engaging terminals b and d.

An explanation will now be made of various abnormal states and their detection in the engine system, cooling water system and the like of the outboard engine.

Since it is dangerous when the engine operates in a gear mode (forward or reverse) other than the neutral mode, a neutral switch 131 is provided so that the starter motor is made operative only when the gear is in the neutral mode. Therefore, in a mode other than the neutral mode, even if an ignition switch 128 is set to "start", the neutral switch 131 is "off" and so no current flows through a starter motor relay RY₂ 132 and the circuit is not connected. Thus, the starter motor does not operate. However, this can cause the driver to be confused if he is not conscious of the fact that the gear is not in neutral.

In the inventive embodiment, both ends of the neutral switch 131 are connected to an input/output interface (I/O) 220 of the voice output circuit 200, which will be explained hereinafter.

Therefore, in the voice output circuit 200, a potential difference across the neutral switch 131 can be detected. When the potential difference is present, it is determined in circuit 200 that the ignition switch 128 is set to "start" but the gear is set to a mode other than neutral mode. Therefore, a voice stating "return the shift lever to neutral" is synthesized in circuit 240 and is output from the speaker 300.

An emergency switch (E/SW) 134 is provided to immediately stop a ship or boat in the case where the driver falls off the ship and into the sea during operation due to some cause. The E/SW 134 has a structure where a cap with a rope is removably attached to a switch main body and the cap presses a shaft of the switch, thereby turning "off" the switch contact. When the cap is detached from the main body, the shaft is returned to thereby turn "on" the contact. The rope attached to the cap is coupled to the body of the driver during operation. If he falls into the sea, the cap is obviously detached from the switch main body, so that the contact is turned "on". The switch 134 is connected in parallel with a stopping circuit of the ignition switch 128 and, when the cap is detached, the stopping circuit is made operative so that the engine is stopped.

On the other hand, there is also a case where, although the cap of the E/SW 134 is attached, the stopping circuit is short-circuited in the midway.

In the embodiment, the stopping circuit of ignition switch 128 and the emergency switch 134 are connected through a diode 101 to the plus side of a capacitor charging coil 133 associated with a conventional and not-illustrated magnet on a conventional and not-illustrated rotor. Further, the connection between switches 128 and 134 is connected to the I/O 220 of voice output circuit 200. A rectifier 130 is connected to both ends of a battery charging coil 129 associated with a not-illustrated and conventional magnet on a conventional and not-illustrated rotor. A battery 126 is charged through a fuse 127. One side of rectifier 130 and one side of battery charging coil 129 are connected to the I/O 220 of the voice output circuit 200 by line 135.

The starter motor is made operative by setting the ignition switch 128 to "start". The not-illustrated rotor having the magnet thereon is rotated. Thus, an output is generated in the battery charging coil 129 and its rotation signal on line 135 is input to the voice output circuit 200. It is determined by circuit 200 that the engine is rotating. At this time, if the cap of the E/SW 134 is detached or the midway of the stopping circuit is connected to the ground, no spark will be generated and, at the same time, an output of the I/O 220 corresponding to this input is set to the "low (L)" level. It is thereby determined by circuit 200 that the abnormal state occurs and a voice of "stop circuit is abnormal" is output. On the other hand, if the cap of the E/SW 134 is normally attached and the stopping circuit in the midway is also normal, the output of the I/O 220 corresponding to this input is at the "high (H)" level. It is decided by circuit 200 that circumstances are normal, so that no voice signal is output by circuit 200.

Engine oil is provided in an oil tank, and when the oil level is at or below a predetermined level, an oil level switch 136 is "turned on", thereby informing the driver to supply oil.

One side of the oil level switch 136 is connected to the I/O 220 of the voice output circuit 200. When the oil level switch 136 is "turned on" the output level of the I/O 220 corresponding to this input is set from "H" to "L". It is decided by circuit 200 that the oil level has reached the alarm level. A voice indicating that the oil level is at the alarm level is output through speaker 300. When the driver supplies oil, the oil level switch 136 is "turned off", the output of the I/O 220 for that input is set to "H", and the voice output is stopped.

A water sensor 137 is attached to the cylinder head portion of the engine or the like and has the function of detecting an abnormality when the cooling water, which is normally circulated in the jacket after the engine is started, is stopped due to an abnormality during engine operation. In the embodiment, in the case of the abnormality, the water sensor 137 is "turned on".

One side of the sensor 137 is likewise connected to the I/O 220 of the voice output circuit 200. When the water sensor 137 is "turned on", the output level of the I/O 220 for that input is set from "H" to "L". It is decided by circuit 200 that the abnormality of the cooling water has occurred and a voice of "cooling water is abnormal" is output. When the abnormal state is released and the water sensor 137 is "turned off", the voice output is obviously stopped.

Separate from the warning of the oil level in the oil tank, if an oil filter provided along the path of the oil flow from the oil tank to the engine section becomes choked or clogged, the oil does not flow and the engine could be burned. An oil flow sensor 139 detects whether the oil flow is normal or abnormal. If the oil flow becomes abnormal, the oil flow sensor 139 is "turned on". One side of the oil flow sensor 139 is connected to the I/O 220 of the voice output circuit 200. When the oil flow sensor 139 is "turned on", the output level of the I/O 220 of the voice output circuit 200 corresponding to that input is set from "H" to "L". It is determined by circuit 200 that the oil flow is abnormal, and circuit 200 outputs a voice of "oil flow is abnormal". When the abnormal state is released and the oil flow sensor 139 is "turned off", the voice output is stopped.

In general, when the rotating speed of the engine increases above an upper limit, the engine can be damaged or durability deteriorates. Therefore, the engine drive control circuit 50 has a conventional and not-illustrated rev-limiter circuit to selectively inhibit ignition sparks when the engine rotating speed reaches or attempts to exceed a predetermined rotating speed (over-rotation preventing set rotating speed). Also, in the case where the cooling water is not circulated in the cylinder jacket or the oil level has reached the alarm level or the like, if the engine speed is at or above a preset rotating speed (abnormality set rotating speed), ignition sparks are similarly cut to reduce the engine rotating speed to a set rotating speed.

An output signal line 138 from a conventional revlimiter circuit (not shown) is connected to the I/O 220 of the voice output circuit 200. When a rev-limit signal is input to circuit 200 from the output signal line 138, It is determined by circuit 200 that the revlimiter operates. As a result, a voice of "indication of rotating speed down" is output from the speaker 300.

The construction and operation of the voice output circuit 200 will now be described.

The voice output circuit 200 comprises: the I/O 220; a central processing unit (CPU) 230; a voice synthesizing processor 240; an amplifier (AMP) 250; and the like. Reference numeral 110 denotes a power supply circuit.

In the power supply circuit 110, a battery power source is input and adjusted to create operating voltages required for the CPU 230 and the like, and a stable voltage of a predetermined level is output to the I/O 220, central processing unit (CPU) 230, voice synthesizing processor 240, and the like. The I/O 220 converts the signals input from the sensors, switches and the like into signals which can be received by the CPU 230, and outputs these signals to the CPU 230.

On the basis of each signal from the I/O 220, the CPU 230 performs a determination regarding whether the signal is abnormal or normal, and arithmetically operates and decides priorities and the like in accord with a predetermined program and uses the results to control outputs A and B of the I/O 22 and to control voice synthesizing processor 240. On the basis of signals from CPU 230 based on the signals from the I/O 220, the voice synthesizing processor 240 extracts fundamental words for the voice signal from a not-illustrated memory (into which the fundamental words for all voice signals are previously input), and forms the necessary voice signal and sends it through a filter 260 to the amplifier 250.

The voice synthesizing processor 240 is connected to the filter 260 through resistors 205 and 206 and a capacitor 211. An output of the filter 260 is connected to the AMP 250 through a capacitor 213 and a resistor 210. The output side of the AMP 250 is connected to one terminal of the speaker 300 through a capacitor 214 and a variable resistor 219 which serves as output level adjusting means. The opposite terminal of the speaker 300 is connected to the AMP 250. Capacitors 211 to 216 are provided to absorb noise and thus improve the signal-to-noise (S/N) ratio.

The sound volume switching operation of the voice output circuit 200 will now be described.

A series circuit of a diode 302 and resistor 207 and another series circuit of a diode 303 and resistor 208 are combined to construct the voice level variable setting circuit 290. One end of the setting circuit 290 is connected to a resistor 209, and the other ends are connected to the I/O 220 at outputs A and B, respectively. The potentials at the output points A and B are controlled by the CPU 230 so that both of them are set to the "high level", both are set to the "low level", or point B is set to the "low level" while point A is set to the "high level".

A voice output signal from the voice synthesizing processor 240 passes through the resistors 205 and 206 and capacitor 211, and is input to the filter 260 where any high frequency component is cut. Then, the signal is transmitted through the capacitor 213 and resistor 210 and is amplified by the amplifier 250, and then passes through capacitor 214 and variable resistor 219 and is output as an audible voice from the speaker 300.

At this time, when the engine rotating speed is at or below speed $R_1$ shown in FIG. 4, or in other words in speed region $X_1$ in FIG. 4, both of the outputs A and B (FIG. 2) of the I/O 220 are set to the "low level (L)" under control of the CPU 230. Therefore, a part of the voice output current from the voice synthesizing processor 240 is transmitted through the resistors 205 and 209 and has a value determined by a combined resistance value of the resistors 207 and 208, and flows into the outputs A and B of the I/O 220. In this manner, the output current from the voice synthesizing processor 240 is fairly reduced, and only a portion flows on to the filter 260. The sound volume of the signal which was amplified by the AMP 250 is finally output from the speaker 300 can be adjusted within a range from a solid line to a broken line in the $X_1$ region in FIG. 4 through manual adjustment of the variable resistor 219.

Figure 4:
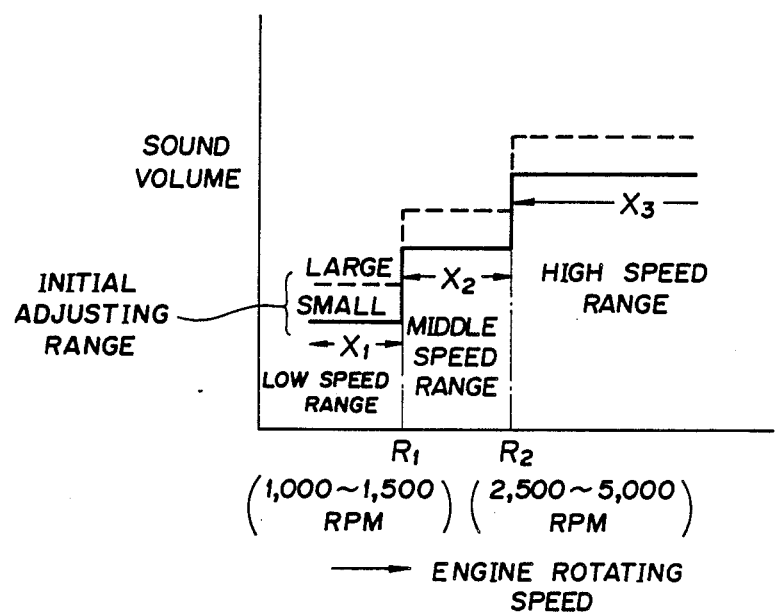
FIG. 4 is a graph showing a step-like change in the level of a voice output from a voice output circuit in response to changes in engine speed.

When the throttle is then opened and the engine rotating speed is raised and exceeds a rotating speed $R_1$ (preferably about 1000 to 1500 r.p.m.) in FIG. 4, the A output of the I/O 220 is set to the "H" level, so that there is a minimal voltage drop across and minimal current flow through resistor 207. A part of the voice output from the voice synthesizing processor 240 flows into the B output of the I/O 220 as a current which is determined by the value of the resistor 208. Since the value of the resistor 208 is obviously larger than the combined resistance of the resistors 207 and 208 when A and B were both set to "L", the current is smaller than in that case. Therefore, the portion of the current from circuit 240 which flows on to the filter 260 is larger. Consequently, the sound volume which is output from the speaker 300 is larger than that in the case where the rotating speed is $R_1$ or less. This corresponds to a sound volume within the volume range between the solid line and broken line in the speed range of $X_2$ in FIG. 4. If the initial adjustment of the sound volume using resistor 219 has a value indicated by the solid line in range $X_1$ when the rotating speed is $R_1$ or less, the sound volume will automatically have the value of the solid like in range $X_2$. If it has a value indicated by the broken line in range $X_1$, is likewise automatically set to the value of the broken line in range $X_2$.

When the throttle is further opened and the engine rotating speed is raised and exceeds a rotating speed $R_2$ (preferably about 2500 to 3000 r.p.m.) in FIG. 4, both the A and B outputs of the I/O 220 are set to the "H" level. No significant portion of the current output from the voice synthesizing processor 240 is diverted to the A and B outputs, but instead substantially all of the current is directly input to the filter 260. Thus, the voice output from the speaker 300 is further increased from the sound volume in the range of $X_2$ in FIG. 4. This similarly corresponds to a volume range between the solid and broken lines in a speed range $X_3$ in FIG. 4.

Since the sound volume is sequentially increased step by step based on the initial value, even in the final range $X_3$, a sound volume difference occurs depending on the initial value.

The difference between the high and low sound volumes at a given speed is set by properly selecting the resistance value of the variable resistor 219. The sound volume increase amounts between ranges $X_1$, $X_2$ and $X_3$ are set by properly selecting the values of the resistors 207 and 208. On the other hand, it is not always necessary to increases between ranges $X_1$, $X_2$ and $X_3$ by the same amount, but it is sufficient to individually increase them in accord with the actual situation.

The FM radio 1 shown in FIG. 1 and arranged beside the voice output circuit 200, and the voice output switching circuit 2 arranged between the radio 1 and the circuit 200, will now be described.

The FM radio 1 comprises: an antenna 3 for reception; an FM tuner unit 4 for tuning radio waves received by the antenna 3 and for converting a radio wave signal into an audio signal; a power amplifier 5 to amplify the audio signal from the FM tuner unit 4; and the like. The input side of the FM tuner unit 4 is connected to a radio power switch 8 which turns the radio on and off. A variable resistor 6 for tuning the radio is provided on the input side of the FM tuner unit 4. A movable contact portion of the tuning variable resistor 6 is connected to the FM tuner unit 4. A variable resistor 7 to adjust the radio audio sound volume is provided on the output side of the FM tuner unit 4. A movable contact portion of the variable resistor 7 for sound volume adjustment is connected to the power amplifier 5 through a capacitor 12 and a resistor 22. One end of the tuning variable resistor 6 is connected to the radio power switch 8 and the other end is connected to ground through a resistor 21. A capacitor 11 is connected in parallel with resistor 21 and tuning variable resistor 6. The power switch 8 is connected to the battery 126 through the ignition switch 128 and the fuse 127. The capacitors 11 to 16 are provided to absorb noise and thus improve the S/N ratio.

The voice output switching circuit 2 comprises: an integrated circuit (IC) 9 for voice discrimination connected through a capacitor 31 and a resistor 41 to the output line from the AMP 250 of the voice output circuit 200 mentioned above; the relay $RY_1$ 10, which has one end of its coil connected to the output side of the voice discriminating IC 9 through a resistor 42 and a transistor 51, and the other end of its coil connected to the ignition switch 128; and the like.

Describing this in further detail, the side of resistor 41 connected to capacitor 31 is also connected to the ignition switch 128 through a resistor 44. The voice discriminating IC 9 is connected to the ignition switch 128 through a resistor 43. The side of the resistor 43 connected to the voice discriminating IC 9 is connected to a further input of IC 9 through a capacitor 32. The resistor 43 and capacitor 32 are provided to control a signal output time of the voice discriminating IC 9. The resistor 42 is connected to a base of the transistor 51. A collector side of the transistor 51 is connected to the relay $RY_1$ 10. circuit 200 are connected to the normally-on The output lines from the AMP 250 of the voice output terminals b and d of the contact portion 10a of the relay $RY_1$ 10 at the front stage of the speaker 300, the plus line being connected to terminal b through the variable resistor 219 serving as an output level adjusting device, or in other words a volume control. One end of a resistor 45 and one end of a diode 46 are connected to ground, and their other ends are each connected to an end of the resistor 41.

Power amplifier output terminals of the FM radio 1 are connected to normally-off terminals a and c of the contact portion 10a of the relay $RY_1$ 10.

The overall operation of the above embodiment will now be described.

By "turning on" the power switch 8 of the FM radio when the ignition switch 128 is set to "on", relay $RY_1$ 10 sets its contact portion 10a so as to always connect the power amplifier 5 of the FM radio with the speaker 300, so that the voice of the FM radio 1 is output from the speaker 300.

Figure 3:
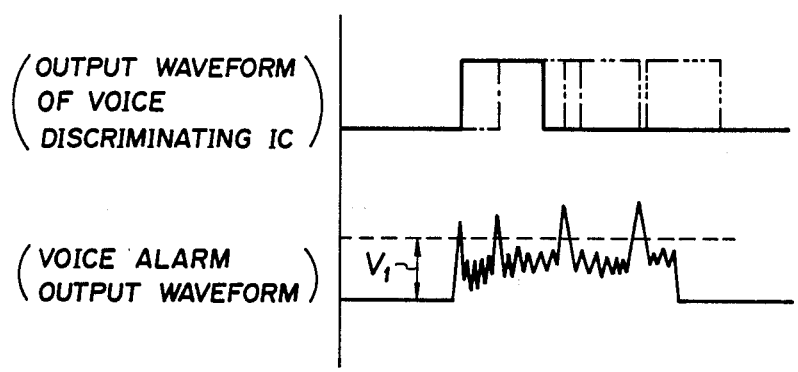
FIG. 3 is a timing diagram showing the relation between a voice alarm output waveform of a voice output circuit and the output waveform of a voice discriminating circuit.

Next, when an abnormality occurs at the engine during operation of the FM radio and an alarm voice signal is output from the voice output circuit 200, such alarm voice signal is input to circuit 2 from the voice signal output line through the capacitor 31. On the other hand, the capacitor 31 also carries a d.c. voltage from the battery 126. When a signal exceeding a certain level $V_1$ determined by the charge/discharge balance of he input is produced by the output signal from the voice output circuit 200 and the voltage on capacitor 31 from the battery 126 and is input to the voice discriminating IC 9, a signal is output from the voice discriminating IC 9 for a predetermined time as shown in FIG. 3. When an alarm voice is output, portions of it having levels of $V_1$ or higher are sequentially input to the voice discriminating IC 9, and outputs for the predetermined time are successively output by IC 9 and overlap. Thus, the signal output from the voice discriminating IC 9 eventually continues substantially for the predetermined time after completion of the alarm voice output from the voice output circuit. It is sufficient to set this predetermined time of the voice discriminating IC 9 by the output time for one alarm signal mentioned above. This predetermined time is determined by the resistance value of the resistor 43 and the capacity of the capacitor 32 mentioned above.

The output signal output from the voice discriminating IC 9 is input to the base of the transistor 51. Therefore, the transistor 51 is "turned on". A current flows in the closed circuit which includes the battery 126, fuse 127, ignition switch 128, relay $RY_1$ 10, transistor 51, and ground. The contact 10a which was selecting the FM radio 1 is switched and set to select the voice output circuit, due to the operation of the solenoid of the relay $RY_1$ 10.

That is, the speaker 300 is temporarily switched from being connected to the FM radio 1 so as to be connected to the voice output circuit. The voice output of the FM radio 1 is thus interrupted and the alarm output from the voice output circuit 200 is output.

When the predetermined time has passed after completion of the alarm voice output, the signal from IC 9 lapses and so no current flows to the base of the transistor 51. Therefore, the transistor 51 is "turned off" and the solenoid of the relay $RY_1$ 10 also loses the attractive force and the contact of the relay $RY_1$ 10 is returned to its original position. Therefore, the voice signal of the FM radio which was temporarily interrupted is again output.

In this embodiment, since the voice output switching means 2 can be miniaturized as a whole, it can be actually easily enclosed in the speaker enclosure.

As described above, according to this embodiment, the level of an alarm voice signal output from the voice output circuit 200 is detected during the operation of the FM radio 1, thereby temporarily disconnecting the speaker 300 from the FM radio 1 and connecting it to the voice output circuit 200. Therefore, since all of the processes can be executed in the speaker casing, there is the advantage that the construction can be simplified and the cost is cheap. On the other hand, with an increase in engine rotating speed, the output signal level of the voice output circuit 200 is automatically increased step by step while the output of the FM radio 1 is inhibited so that the alarm voice can be output. Thus, even under high speed running, the driver can easily hear the alarm and there is the advantage that there is no need to reduce the sound volume of the radio or the like.

In this embodiment, six kinds of abnormality detections have been described. However, if other abnormalities to be detected exist, they can be arbitrarily added.

An explanation has been made with respect to the case where the oil level switch, water sensor, and oil flow sensor are normally set to "off" and are set to "on" when an abnormality occurs, and each output section of the I/O 220 of the voice output circuit induces a voice output when it changes from "H" to "L". However, the invention is not limited to this system. To the contrary, the sensors could be normally set to "on" and then set to "off" when an abnormality occurs, and each output section of the I/O 220 of the voice output circuit could induce a voice alarm when it changes from "L" to "H".

Since the present invention has the structure and function mentioned above, the speaker is temporarily switched from the acoustic reproducing arrangement to the voice output circuit due to the operation of the voice output switching circuit when an abnormality occurs. The voice output switching circuit can be constructed by, for instance, an IC and a relay, as in the foregoing embodiment. In such a case, there is no need to provide a circuit to switch to the voice circuit side and the like. Moreover, the voice output switching circuit is small and can be easily assembled into the speaker.

Consequently, the apparatus can be relatively cheaply provided and the response speed can be improved as compared with the case of the switching controlled by software in CPU 230. In this manner, it is possible to provide an excellent voice alarm output switching apparatus which is suitable for use in an outboard engine and which has not been proposed hitherto.

In the foregoing embodiment, the example of the case using an FM radio has been shown. However, the present invention is not limited to this example, and it is also possible to use as the acoustic reproducing arrangement an AM radio, AM/FM two-band radio, stereophonic phonograph, or the like.

Figure 5:
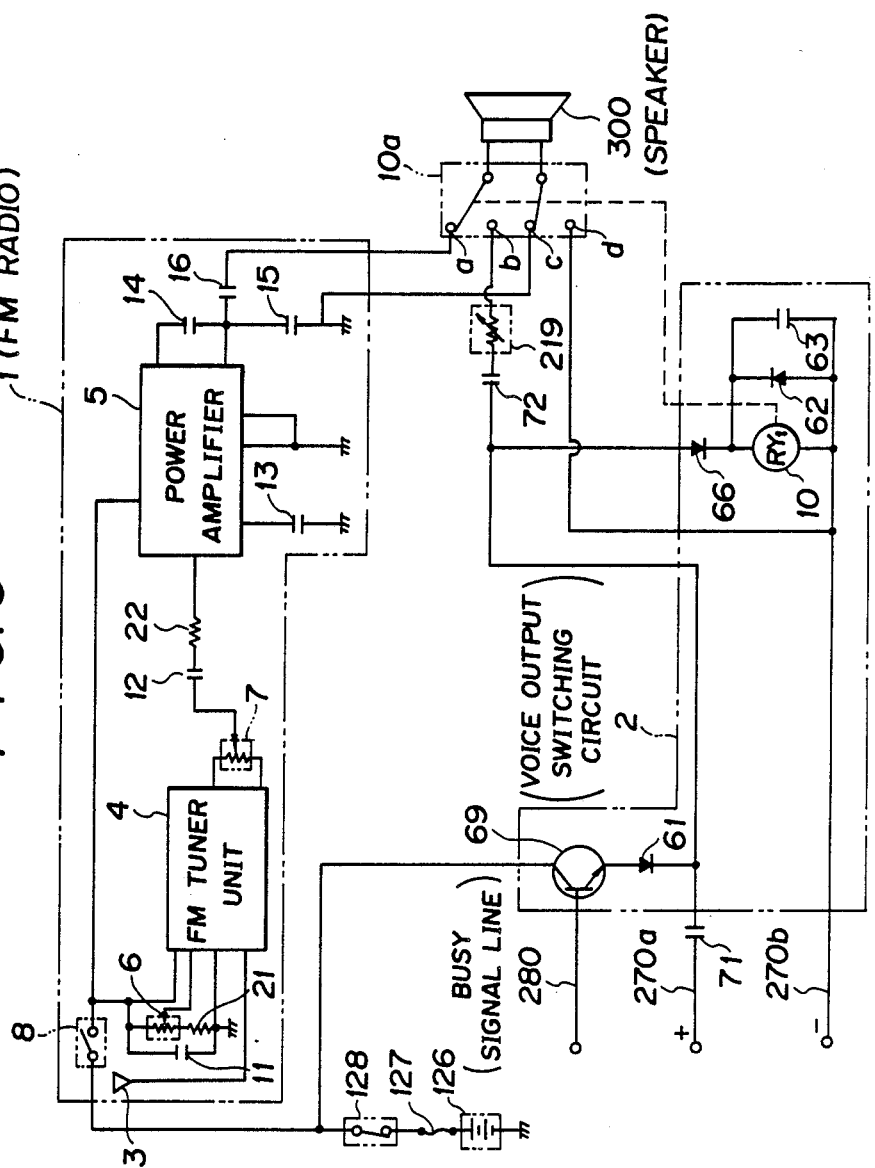
FIG. 5 is a diagrammatic view of part of a second embodiment of the invention.
Figure 6:
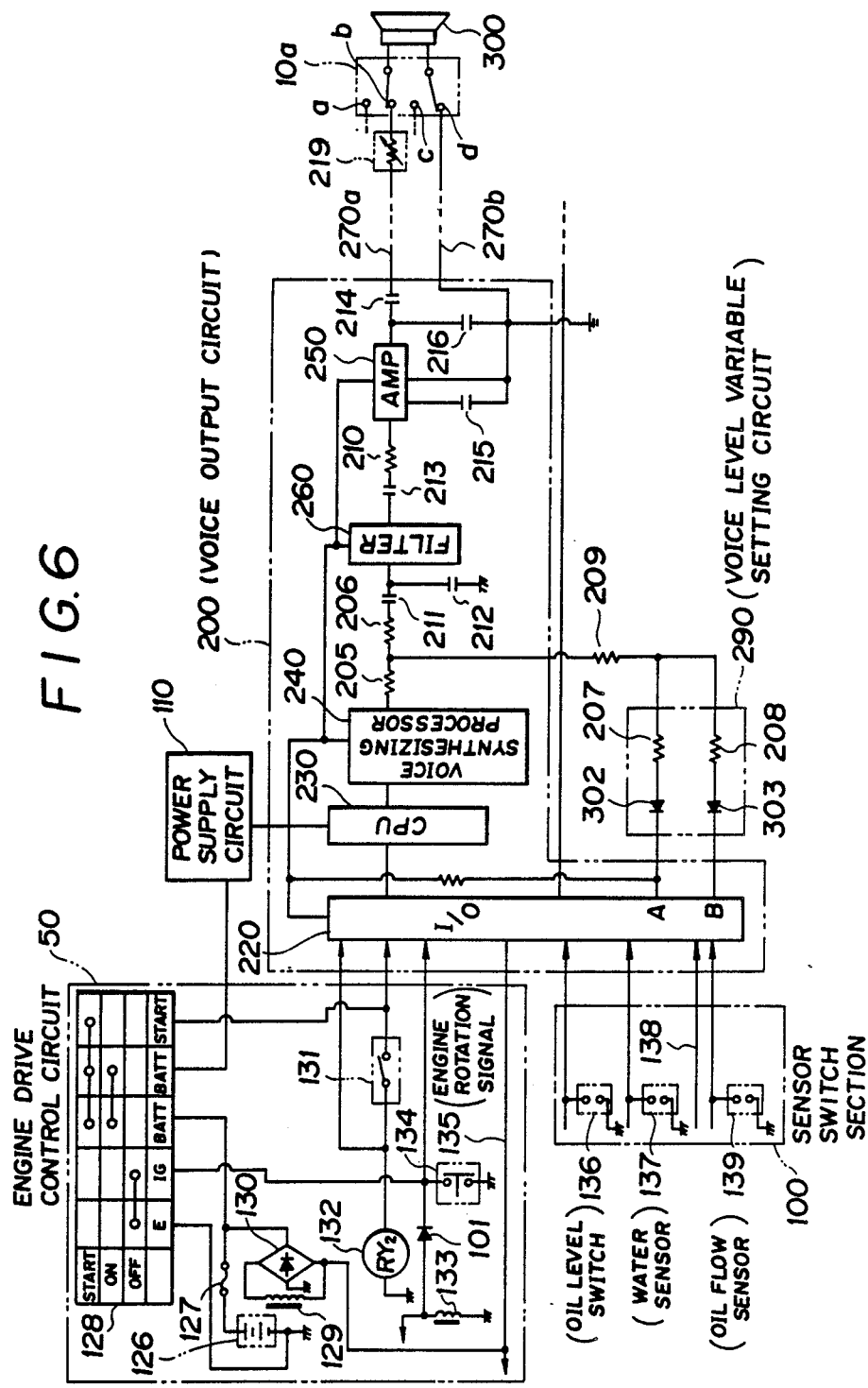
FIG. 6 is a diagrammatic view of a further part of the embodiment of FIG. 5.

Another embodiment of the present invention will now be described hereinbelow with reference to FIGS. 5 and 6. In FIGS. 5 and 6, parts and components similar to those shown in FIGS. 1 and 2 are designated by the same reference numerals, and their detailed descriptions are omitted.

Since the second embodiment to an extent is constructed and functions in a manner similar to the first embodiment shown in FIGS. 1 to 4, their overlap descriptions are omitted and only the construction and operation of features of the second embodiment different from the first embodiment will be described in detail hereinbelow.

In FIG. 5, the voice output switching circuit 2 comprises: a transistor 69 whose emitter side is connected through a capacitor 71 and a diode 61 to a plus side 270a of a voice output signal line from the AMP 250 of the voice output circuit 200; the relay $RY_1$ 10, which has one end connected through a diode 66 and capacitor 71 to the plus side 270a of the voice output signal line from the AMP 250 and the other end connected to a minus side 270b of the voice output signal line; and the like.

Describing the above construction in further detail, the collector side of the transistor 69 is connected to the ignition switch 128, and the base side is connected to a busy signal line 280, to which a busy signal is output from the I/O 220 of the voice output circuit 200 when the voice output circuit 200 is outputting a voice. The plus side 270a of the voice output signal line from the AMP 250 is connected to a normally on terminal b of contact 10a of the relay $RY_1$ 10 through capacitors 71 and 72 and variable resistor 219. The minus side 270b of the voice output signal line is also connected to a normally-on terminal d of contact 10a of the relay $RY_1$ 10. The capacitors 71 and 72 are provided to absorb a DC component and allow only an AC component to be supplied to the speaker 300.

A diode 62 and a capacitor 63 are each connected in parallel with the relay $RY_1$ 10 (coil portion). Between them, the capacitor 63 is provided to absorb a surge output which is generated instantaneously when a current flows into the coil of the relay $RY_1$ 10. The diode 62 is provided to protect the transistor 69 and the like by absorbing a counter-electromotive force which is generated instantaneously when the current is shut off.

A power amplifier output terminal of the FM radio 1 is connected to normally-off terminals a and c of the contact portion 10a of the relay $RY_1$ 10.

The overall operation of the above embodiment will now be described.

By "turning on" the power switch 8 of the FM radio when the ignition switch 128 is set to "on", the contact portion 10a of the relay $RY_1$ 10 is set to normally connect the power amplifier 5 of the FM radio with the speaker 300, so that the audio output of the FM radio 1 is output from the speaker 300.

Next, when an abnormality occurs at the engine during operation of the FM radio and an alarm voice signal is output from the voice output circuit 200, a busy signal indicating that the voice output circuit 200 is outputting a voice is output on line 280 from the I/O 220 of the voice output circuit 200 to the base of the transistor 69. Thus, current flows through the base of the transistor 69, the emitter of the transistor 69, the diode 61, the diode 66, and the coil of the relay $RY_1$ 10 to ground, so that the transistor 69 is "turned on". Therefore, current from the battery 126 flows through the transistor 69, diode 61, diode 66, and the coil of the relay $RY_1$ 10 to ground. The contact 10a is disconnected from the power amplifier of the FM radio 1 and is connected to the voice output circuit due to the operation (attractive force) of the relay $RY_1$ 10.

That is, the speaker 300 is temporarily disconnected from the FM radio 1 and connected to the voice output circuit 200. The voice output of the FM radio 1 is thus temporarily interrupted and the alarm output from the voice output circuit 200 is output.

After completion of the alarm voice output, the busy signal on line 280 is deactuated, so that no current flows to the base of the transistor 69. Therefore, the transistor 69 is "turned off" and the coil of the relay $RY_1$ 10 also loses the attractive force and the contact of the relay $RY_1$ 10 is returned to the original position. Therefore, the output of the FM radio which was temporarily shut off is again output.

In this embodiment, since the voice output switching circuit 2 can be miniaturized as a whole, it can be actually easily enclosed in the speaker.

As described above, according to this embodiment, when an alarm voice is output from the voice output circuit 200 during operation of the FM radio 1, the busy signal output from the voice output circuit 200 is used to cause the speaker 300 to be temporarily switched from the FM radio 1 to the voice output circuit 200. Therefore, all processes can be executed in a speaker casing. Since the relay is operated using a battery power source by this very simple circuit, there are the advantages that a malfunction due to noise or the like can be effectively prevented and the apparatus can be simplified with a low cost. With an increase in engine rotating speed, the output signal level of the voice output circuit 200 is automatically increased in a step by step manner and, at the same time, the output of the FM radio 1 is shut off while the alarm voice is output. Thus, even under high speed running, the driver can easily hear the alarm sound and there is the advantage that there is no need to reduce the sound volume of the radio or the like.

In this embodiment, six kinds of abnormality detection have been described. However, if other abnormalities to be detected exist, they can be arbitrarily added.

An explanation has been made with respect to the case where the oil level switch, water sensor, and oil flow sensor are normally set to "off" and are set to "on" when an abnormality occurs, and in which each output section of the I/O 220 of the voice output circuit induces a voice when it changes from "H" to "L". However, the invention is not limited to this system. To the contrary, no problem occurs if the sensors are normally set to "on" and are set to "off" when an abnormality occurs, and if each output section of the I/O 220 of the voice output circuit thus induces a voice when it changes from "L" to "H".

Since this embodiment is constructed and functions as mentioned above, the speaker is temporarily switched from the acoustic reproducing circuit to the voice output circuit due to the operation of the voice output switching circuit when an abnormality occurs. The voice output switching circuit can be constructed by, for instance, a transistor and a relay as in the foregoing embodiment. In such a case, there is no need to provide a circuit to switch to the voice circuit and the like. Moreover, the voice output switching circuit is small and can be easily assembled into the speaker. Consequently, the apparatus can be relatively cheaply provided and the response speed can be improved as compared with the case of switching controlled by software in a microcomputer. During a voice output of the voice output circuit, the speaker is switched by the operation signal output from the voice output circuit. Therefore, a malfunction due to noise or the like can be substantially completely prevented. In this manner, it is possible to provide an excellent voice alarm output switching apparatus which is suitable for use in an outboard engine and which has not been proposed hitherto.

In the second embodiment, the example of the case of using an FM radio has been shown. However, the present invention is not limited to this example but it is also possible to use as an acoustic reproducing device an AM radio, AM/FM two-band radio, stereophonic phonograph, or the like.

Although the present invention has been described and shown with respect to the preferred embodiments, the invention is not limited to the foregoing embodiments, and many modifications and variations, including the rearrangement of parts, are possible within the spirit and scope of the appended claims of the invention.

The embodiments of the invention in which an exclusive property or privilege is claimed are defined as follows:

1. An apparatus for use in an outboard engine for switching a voice alarm output, comprising:
   a plurality of sensors for detecting respective abnormal states, including abnormality of a cooling water;
   a voice output circuit for receiving output signals from said plurality of sensors and for outputting a voice signal identifying the abnormal state;
   acoustic reproducing means for producing an audio output signal;
   a speaker; and
   voice discriminating switching means for detecting a level of an audio output signal from said voice output circuit and for temporarily switching the speaker from being connected to the acoustic reproducing means to being connected to the voice output circuit in response to detection of said level.

2. An apparatus comprising: sensor means for outputting a detection signal in response to detection of a predetermined condition; voice output circuit means responsive to said detection signal from said sensor means for outputting a voice signal identifying said predetermined condition; means for generating an audio output signal; a speaker; and switching means for selectively supplying to said speaker one of said voice signal and said audio output signal as a function of a level of said voice signal.

3. An apparatus as recited in claim 2, wherein said switching means supplies said voice signal to said speaker when said level of said audio output signal is above a predetermined level.

4. An apparatus as recited in claim 3, wherein said switching means includes discriminating circuit means for producing an output signal when said level of said voice signal is above said predetermined level and for a predetermined time period after said voice signal drops below said predetermined level, said switching means respectively supplying said voice signal and said audio output signal to said speaker when said output signal of said discriminating circuit means is respectively actuated and deactuated.

5. An apparatus as recited in claim 4, wherein said switching means includes a relay having a coil and having contact means responsive to an electromagnetic field of said coil for selectively supplying to said speaker one of said voice signal and said audio output signal.

6. An apparatus as recited in claim 5, wherein said switching means includes a first resistor having first and second ends, said first end of said first resistor being coupled to an output of said voice discriminating means which carries said output signal; and includes a transistor having an emitter coupled to ground, a base coupled to said second end of said first resistor, and a collector coupled to a first end of said coil of said relay, a second end of said coil of said relay being coupled to a source of power.

7. An apparatus as recited in claim 6, wherein said switching means includes a second resistor having a first end coupled to an input of said voice discriminating means and having a second end, and a first capacitor having a first end coupled to said second end of said second resistor and having a second end coupled to an output of said voice output circuit means carrying said voice signal.

8. An apparatus as recited in claim 7, including a third resistor having a first end coupled to said source of power and a second end coupled to said second end of said second resistor, a fourth resistor having a first end coupled to said second end of said second resistor and a second end coupled to ground, and a diode having a cathode coupled to said second end of said second resistor and an anode coupled to ground.

9. An apparatus as recited in claim 8, wherein said voice discriminating means includes two further inputs, and wherein said switching means includes a second capacitor having ends respectively coupled to said further inputs of said voice discriminating means, and includes a fifth resistor having a first end coupled to said source of power and a second end coupled to one of said further inputs of said voice discriminating means.

10. An apparatus comprising: sensor means for outputting detection signal in response to detection of a predetermined condition; voice output circuit means responsive to said detection signal from said sensor means for outputting across first and second terminals a voice signal identifying said predetermined condition and for outputting at a third terminal a busy signal; means for generating an audio output signal; a speaker; and switching means for selectively supplying to said speaker one of said voice signal and said audio output signal, including a relay having a coil and having contact means responsive to an electromagnetic field of said coil for selectively supplying to said speaker one of said voice signal and said audio output signal, a transistor having a collector coupled to a source of power, having a base coupled to said third terminal of said voice output circuit means, and having an emitter, a first diode having an anode coupled to said emitter of said transistor and having a cathode, a first capacitor having a first end coupled to said first terminal of said voice output circuit means and a second end coupled to said cathode of said first diode, a second capacitor having a first end coupled to said cathode of said first diode and a second end coupled to said contact means, and a second diode having an anode coupled to said cathode of said first diode having an anode coupled to a first end of said coil of said relay, a second end of said coil of said relay being coupled to said second terminal of said voice output circuit means.

11. An apparatus as recited in claim 10, wherein said switching means includes a third diode having a cathode and an anode respectively coupled to said first and second ends of said coil of said relay, and a third capacitor having first and second ends respectively coupled to said first and second ends of said coil of said relay.

* * * * *

UNITED STATES PATENT AND TRADEMARK OFFICE
CERTIFICATE OF CORRECTION

PATENT NO. : 4 971 583

DATED : November 20, 1990

INVENTOR(S) : Kazuhiro Umehara

It is certified that error appears in the above-identified patent and that said Letters Patent is hereby corrected as shown below:

Col. 14, line 16; delete "having an anode" and replace by ---and a second end---.

Signed and Sealed this

Seventh Day of July, 1992

Attest:

DOUGLAS B. COMER

Attesting Officer

Acting Commissioner of Patents and Trademarks